(12) United States Patent
McCauley

(10) Patent No.: US 9,821,720 B1
(45) Date of Patent: Nov. 21, 2017

(54) SLIDEOUT TRUCK BOX COVER AND SHELVING ASSEMBLY

(71) Applicant: Burton Thomas McCauley, Blaine, MN (US)

(72) Inventor: Burton Thomas McCauley, Blaine, MN (US)

( * ) Notice: Subject to any disclaimer, the term of this patent is extended or adjusted under 35 U.S.C. 154(b) by 0 days.

(21) Appl. No.: 15/487,608

(22) Filed: Apr. 14, 2017

(51) Int. Cl.
   *B60R 9/06* (2006.01)
   *B62D 33/04* (2006.01)
   *B60J 7/04* (2006.01)

(52) U.S. Cl.
   CPC ............ *B60R 9/065* (2013.01); *B60J 7/04* (2013.01); *B62D 33/042* (2013.01)

(58) Field of Classification Search
   CPC . B60R 9/065; B60R 9/00; B60R 11/06; B60J 7/04; B62D 33/042; B60P 3/14
   USPC ................. 224/403–405; 296/26.09
   See application file for complete search history.

(56) References Cited

U.S. PATENT DOCUMENTS

| | | | | |
|---|---|---|---|---|
| 2,784,027 A | * | 3/1957 | Temp | B60P 3/32 224/404 |
| 4,469,364 A | * | 9/1984 | Rafi-Zadeh | B60P 3/14 224/404 |
| 4,830,242 A | * | 5/1989 | Painter | B60P 3/32 224/404 |
| 5,988,722 A | * | 11/1999 | Parri | B60P 1/003 224/403 |
| 5,996,868 A | * | 12/1999 | Paradis | B60R 9/00 224/404 |
| 6,318,781 B1 | * | 11/2001 | McKee | B60R 9/00 296/26.09 |
| 6,908,139 B1 | * | 6/2005 | Szieff | B60J 7/041 296/100.03 |
| 7,794,003 B2 | * | 9/2010 | Crandall | B60R 9/00 224/403 |
| 9,079,548 B1 | * | 7/2015 | Singer | B60R 11/06 |
| 2003/0189074 A1 | * | 10/2003 | Dise | B60R 9/00 224/404 |
| 2006/0219746 A1 | * | 10/2006 | Kniffel | B60R 9/00 224/404 |
| 2010/0288809 A1 | * | 11/2010 | Martin | B60R 9/00 224/404 |
| 2011/0260486 A1 | * | 10/2011 | Thygesen | B62D 33/02 296/26.09 |
| 2015/0034688 A1 | * | 2/2015 | Fisher | B62D 33/0207 224/404 |
| 2016/0167591 A1 | * | 6/2016 | Salinas | B60R 11/06 224/404 |
| 2017/0232907 A1 | * | 8/2017 | Singer | B60R 9/065 224/404 |

* cited by examiner

*Primary Examiner* — Corey Skurdal
(74) *Attorney, Agent, or Firm* — Dave Alan Lingbeck

(57) ABSTRACT

A slideout truck bed cover and shelving assembly for storing and easily accessing items kept in a truck bed. The slideout truck bed cover and shelving assembly includes a cover assembly including a cover member adapted to slide upon and extend from a truck bed; a shelving assembly depending from the cover member; and a storage assembly adapted to be disposed in the truck bed for holding and storing items with the cover member removably disposed over the storage assembly.

14 Claims, 4 Drawing Sheets

SLIDEOUT TRUCK BOX COVER AND SHELVING ASSEMBLY

BACKGROUND OF THE INVENTION

Field of the Invention

The present invention relates to truck bed covers and more particularly pertains to a new slideout truck bed cover and shelving assembly for storing and easily accessing items kept in a truck bed.

Description of the Prior Art

The use of truck bed covers is known in the prior art. More specifically, truck bed covers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a pair of panels which are pivotally mounted on respective sides of the bed. The panels extend laterally inward such that free ends of the panels engage each other in a closed position. The panels may be pivoted upward and secured in an upward orientation by a pair of rails connected between the free ends of the respective panels in an extended position of the panels. Another prior art includes a cover member being rigid about a lengthwise axis and having two lengthwise sides, two lengthwise tracks to be attached to an upper surface of two vertical sidewalls, the tracks being adapted to vertically receive the two sides of cover member; and a locking member provided on each of the two tracks for preventing and allowing cover member from being vertically removed from the tracks, and for preventing the cover member from sliding lengthwise along tracks. Also another prior art includes a bed cover mounted to the side of the truck bed by a hinge. The bed cover is assisted in lifting to an open position and held open by an actuator which may be a single gas spring or a screw powered by an electric motor. The actuator is positioned near the front of the truck bed so it causes minimum obstruction of the cargo space. Yet, another prior art includes a cover assembly for a pick-up truck cargo bed includes first and second rails attachable at the sides of the bed. A cover has a first resilient hinge strip connecting a first panel to a second panel and allowing the first panel to pivot relative to the second panel. A third panel is attached to the second panel by a second resilient hinge strip, which allows the second panel to pivot relative to the third panel. While these devices fulfill their respective, particular objectives and requirements, the aforementioned patents do not disclose a new slideout truck bed cover and shelving assembly.

SUMMARY OF THE INVENTION

The general purpose of the present invention, which will be described subsequently in greater detail, is to provide a new slideout truck bed cover and shelving assembly which has many of the advantages of the truck bed covers mentioned heretofore and many novel features that result in a new slideout truck bed cover and shelving assembly which is not anticipated, rendered obvious, suggested, or even implied by any of the prior art truck bed covers, either alone or in any combination thereof. The present invention includes a cover assembly including a cover member adapted to slide upon and extend from a truck bed; a shelving assembly depending from the cover member; and a storage assembly adapted to be disposed in the truck bed for holding and storing items with the cover member removably disposed over the storage assembly. None of the prior art includes the combination of the elements of the present invention.

There has thus been outlined, rather broadly, the more important features of the slideout truck bed cover and shelving assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new slideout truck bed cover and shelving assembly which has many of the advantages of the truck bed covers mentioned heretofore and many novel features that result in a new slideout truck bed cover and shelving assembly which is not anticipated, rendered obvious, suggested, or even implied by any of the prior art truck bed covers, either alone or in any combination thereof.

Still another object of the present invention is to provide a new slideout truck bed cover and shelving assembly for storing and easily accessing items kept in a truck bed.

Still yet another object of the present invention is to provide a new slideout truck bed cover and shelving assembly that safeguards and organizes property of the user in a truck bed.

Even still another object of the present invention is to provide a new slideout truck bed cover and shelving assembly that separates larger items from the smaller items and also makes it easier for the users to access items which are used most often.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
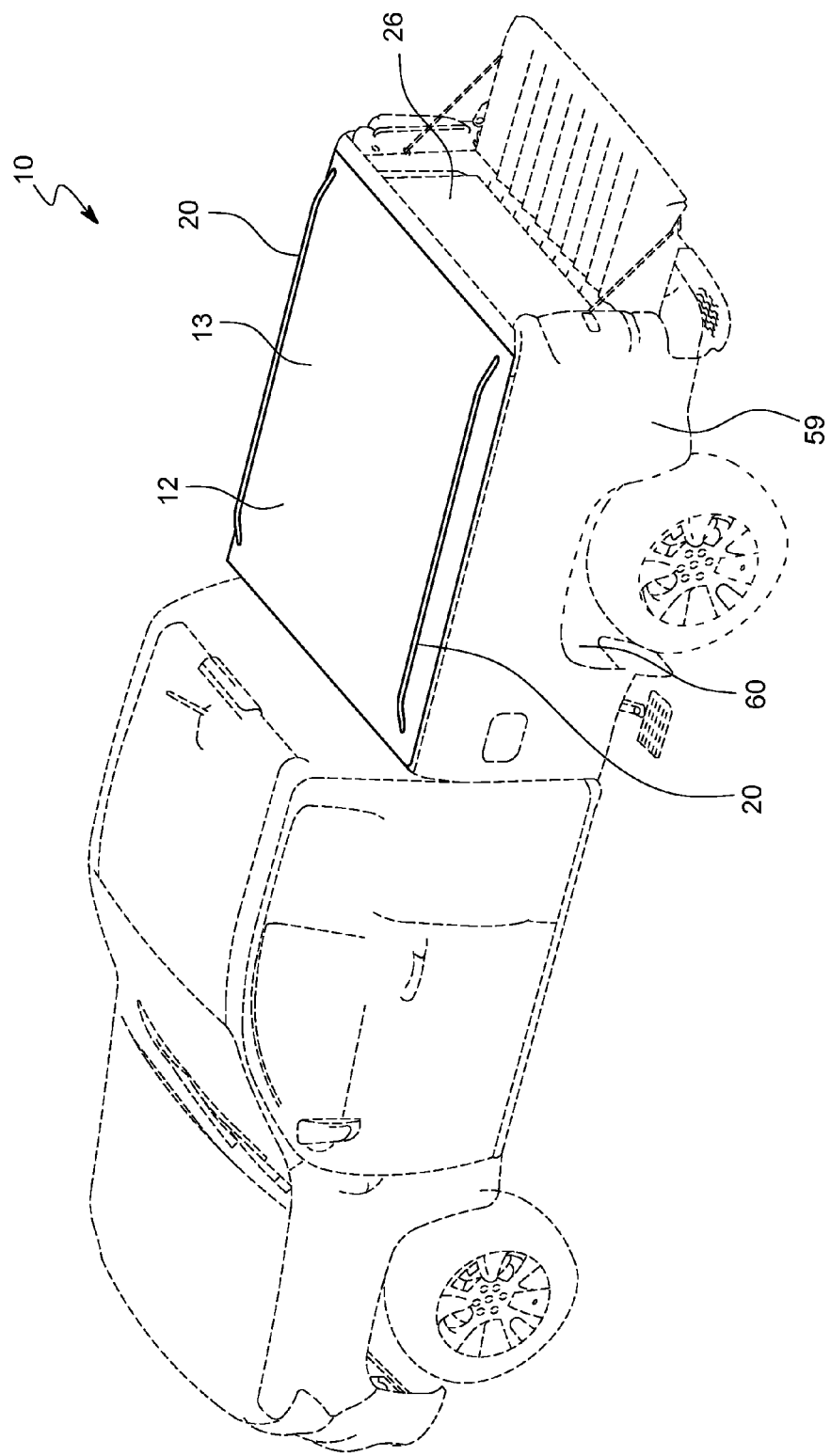
FIG. 1 is a top perspective view of a new slideout truck bed cover and shelving assembly according to the present invention.
Figure 2:
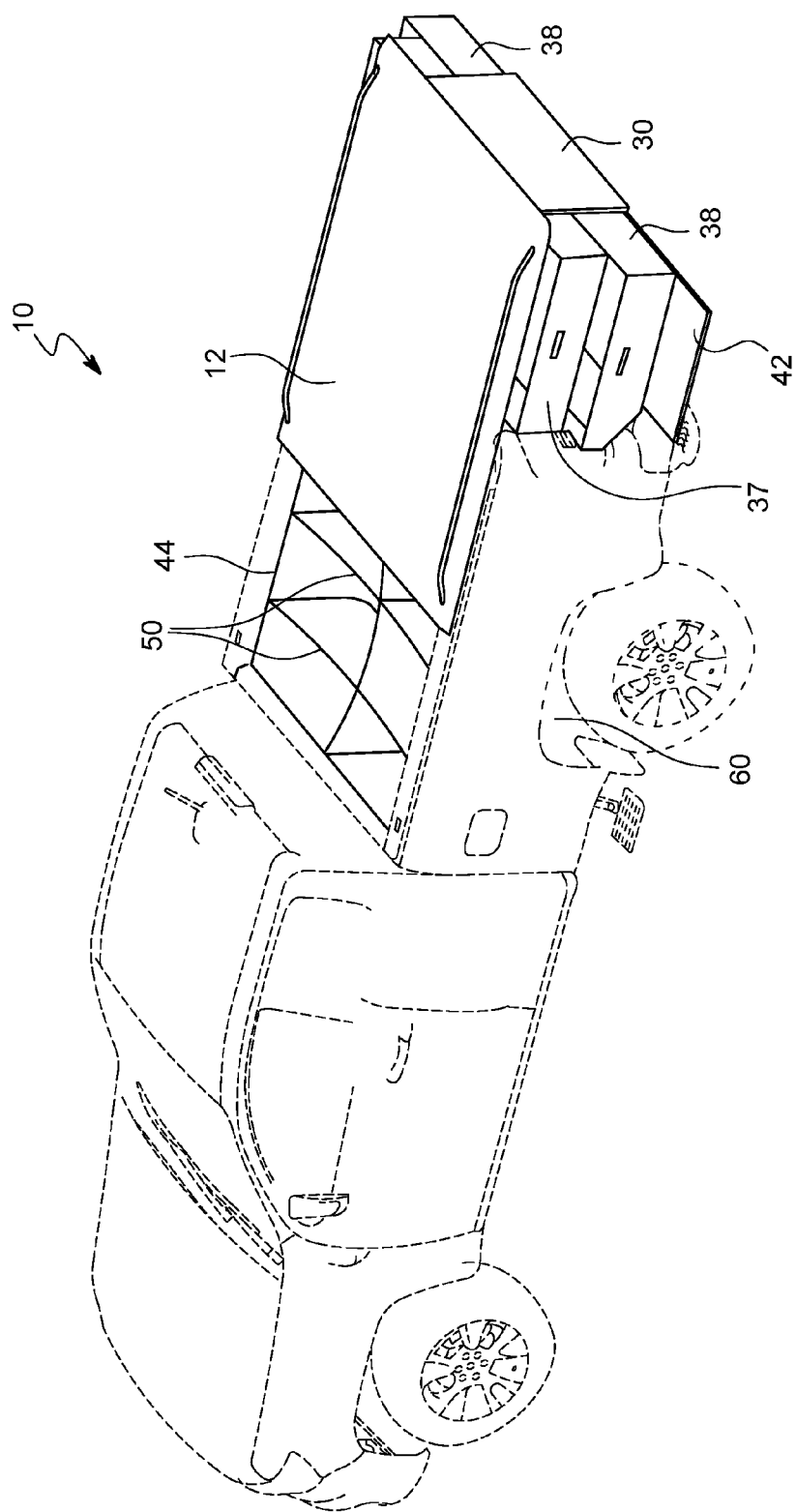
FIG. 2 is a top perspective view of the present invention with the cover assembly slid rearwardly of the truck bed.
Figure 3:
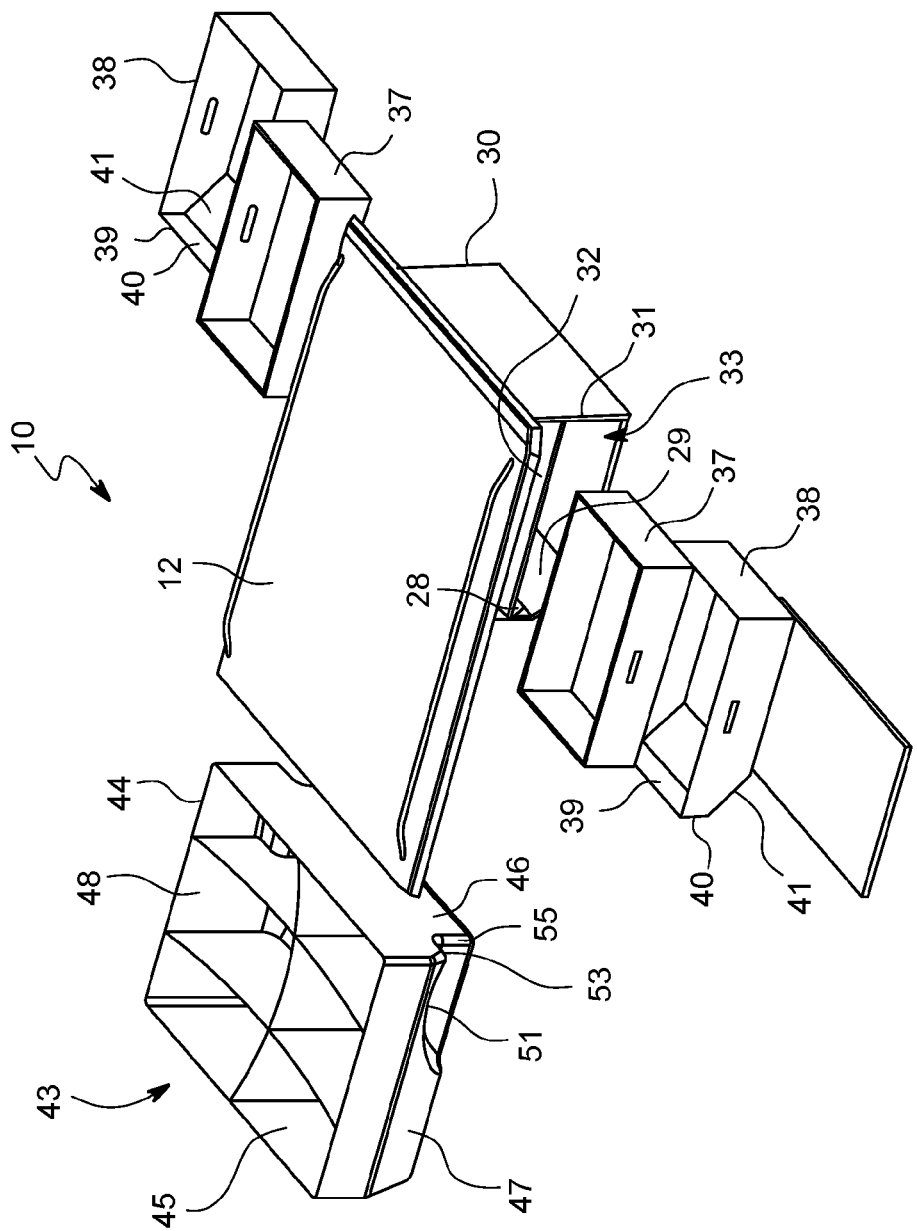
FIG. 3 is an exploded top perspective view of the present invention.
Figure 4:
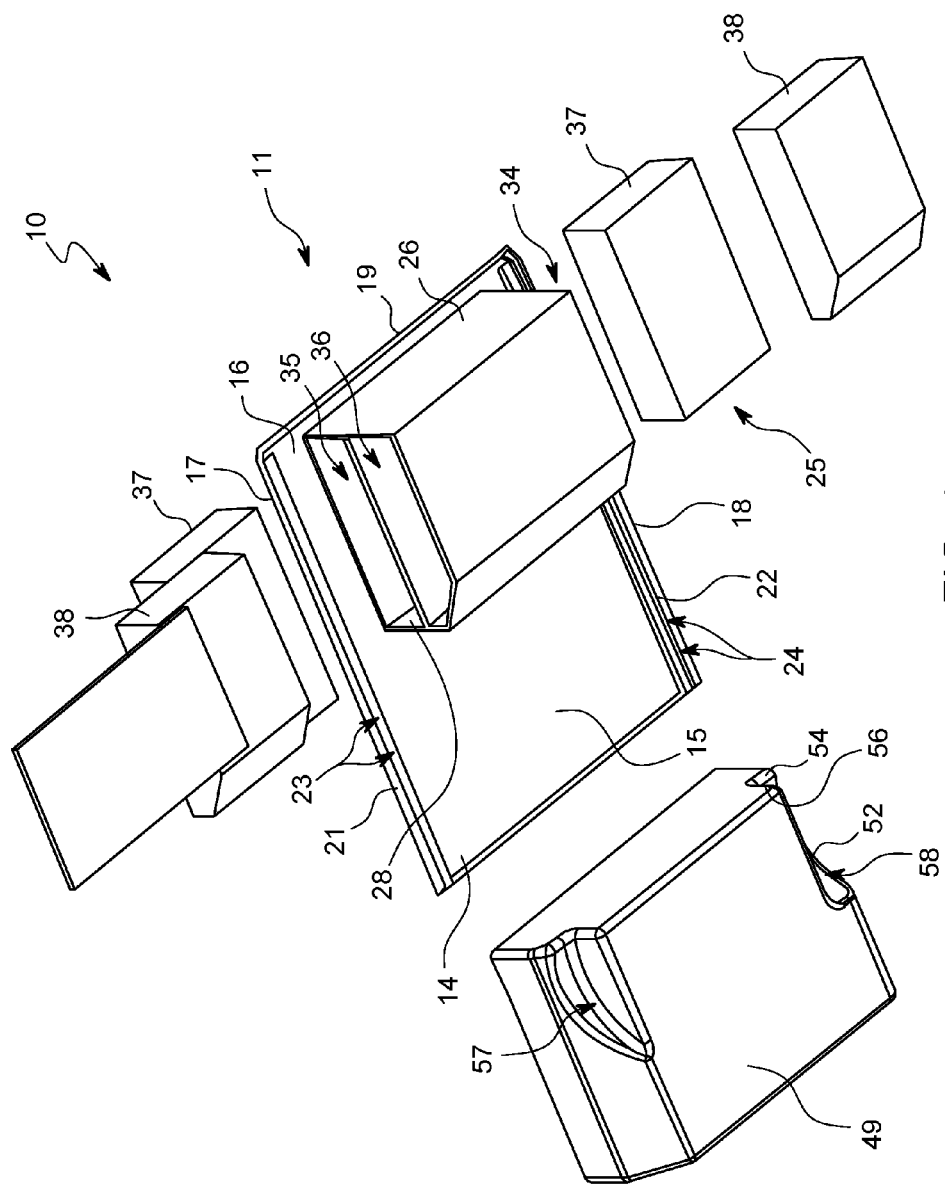
FIG. 4 is an exploded bottom perspective view of the present invention.

With reference now to the drawings, and in particular to FIGS. 1 through 4 thereof, a new slideout truck bed cover and shelving assembly embodying the principles and concepts of the present invention and generally designated by the reference numeral 10 will be described.

As best illustrated in FIGS. 1 through 4, the slideout truck bed cover and shelving assembly 10 generally comprises a cover assembly 11 including a rigid cover member 12 adapted to slide upon and extend from a truck bed 59; a shelving assembly 25 conventionally depending from the cover member 12; and a storage assembly 43 adapted to be disposed in the truck bed 59 for holding and storing items with the cover member 12 removably disposed over the storage assembly 43.

The cover member 12 has a topside 13, bottom side 14, front portion 15, back portion 16 and side edges 17, 18, and also has a length and width substantially equivalent to that of the truck bed 59. The cover assembly 11 also includes elongate handlebars 20 conventionally fastened upon the topside 13, along and near the side edges 17, 18 of the cover member 12 for sliding the cover member 12 upon the truck bed 59. The cover assembly 11 further includes rails 21, 22 conventionally attached to the bottom side 14 and along the side edges 17, 18 of the cover member 12 and extending an approximate length of the cover member 12. The cover assembly 11 also includes rollers 23, 24 in conventional communication with the rails 21, 22 for sliding the cover member 12 upon side walls of the truck bed 59.

The shelving assembly 25 includes a cabinet 26 conventionally depending from the bottom side 14 of the back portion 16 of the cover member 12. The cabinet 26 includes a first side wall 27 disposed intermediate of the front and back portions 15, 16 and conventionally attached to and depending from and transversing the bottom side 14 of the cover member 12 and also includes a second side wall 30 disposed along a back edge 19 of the cover member 12 and conventionally attached to and depending perpendicular from the bottom side 14 of the cover member 12. The cabinet 26 has opposed open ends 33, 34. The first side wall 27 has an upper portion 28 which is perpendicular to the cover member 12 and has a lower portion 29 which is angled inwardly of the cabinet 26 towards the second side wall 30 to properly fit about wheel wells 60, 61 of the truck bed 59. The cabinet 26 further includes a bottom shelf 31 conventionally interconnecting the first and second side walls 27, 30 and also includes an intermediate shelf 32 spaced above the bottom shelf 31 and conventionally interconnecting the first and second side walls 27, 30 and forming an upper compartment 35 between the cover member 12 and the intermediate shelf 32 and forming a lower compartment 36 between the intermediate and bottom shelves 31, 32. The cabinet 26 also includes upper drawers 37 slidably disposed through the opposed open ends 33, 34 in the upper compartment 35 and upon the intermediate shelf 32 and further includes lower drawers 38 slidably disposed through the opposed open ends 33, 34 in the lower compartment 36 and upon the bottom shelf 31. Each of the lower drawers 38 has a side wall 39 facing the first side wall 27 of the cabinet 26 and having an upper portion 40 which is parallel to the upper portion 28 of the first side wall 27 and having a lower portion 41 angled relative to the upper portion 40 of the side wall 39 of the respective lower drawer 38 and parallel to the lower portion 29 of the first side wall 27. The shelving assembly 25 further includes a work platform 42 slidably disposed through the open ends 33, 34 and upon the bottom shelf 31 under the lower drawers 38.

The storage assembly 43 includes a container 44 having front 45, back 46, bottom 49 and side walls 47, 48 and also having partition walls 50 conventionally disposed in the container 44 and forming separate bins within which items can be kept and stored. The side walls 37, 38 have bottom back corners 51, 52 and the bottom wall 49 has back side corners 53, 54 and the back wall 46 has bottom side corners 55, 56, all of which are recessed inwardly of the container 44 forming recessed areas 57 58 of the container 44 to receive the wheel wells 60, 61 in the truck bed 59. The back side corners 53, 54 of the bottom wall 49 are curved downwardly from the back wall 46 towards the front wall 45 and is shaped to accommodate the wheel wells 60, 61 of the truck bed 59.

In use, the user can open the tailgate of the truck bed 59 and can grasp the handlebars 20 and slide the cover member 12 rearwardly of the truck bed 59 to expose the container 44 and also so that the cabinet 26 is beyond the back of the truck bed 59 so that the upper and lower drawers 37, 38 are exposed beyond the back of the truck bed 59. The user can open the upper and lower drawers 37, 38 to either put selected items in the upper and lower drawers 37, 38 or remove selected items in the upper and lower drawers 37, 38 and can also slide the work platform 42 from the cabinet 26 to lay the selected items on the work platform 42. Once finished the user can slide the cover member 12 upon and into the truck bed 59 and secure the cover member 12 by closing and latching the tailgate for the truck bed 59.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the slideout truck bed cover and shelving assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A slideout truck bed cover and shelving assembly comprising:
    a cover assembly including a rigid cover member adapted to slide upon and extend from a truck bed, wherein the cover member has a topside, bottom side, front portion, back portion, and side edges, and also has a length and width substantially equivalent to that of the truck bed;
    a shelving assembly depending from the cover member; and
    a storage assembly adapted to be disposed in the truck bed for holding and storing items with the cover member removably disposed over the storage assembly.

2. The slideout truck bed cover and shelving assembly as described in claim 1, wherein the cover assembly also includes elongate handlebars fastened upon the topside, along and near the side edges of the cover member for sliding the cover member upon the truck bed.

3. The slideout truck bed cover and shelving assembly as described in claim 1, wherein the cover assembly further includes rails attached to the bottom side and along the side edges of the cover member and extending an approximate length of the cover member.

4. The slideout truck bed cover and shelving assembly as described in claim 3, wherein the cover assembly also includes rollers in communication with the rails for sliding the cover member upon side walls of the truck bed.

5. The slideout truck bed cover and shelving assembly as described in claim 1, wherein the shelving assembly includes a cabinet depending from the bottom side of the back portion of the cover member.

6. The slideout truck bed cover and shelving assembly as described in claim 5, wherein the cabinet includes a first side wall disposed intermediate of the front and back portions and depending from and transversing the bottom side of the cover member and also includes a second side wall disposed along a back edge of the cover member and depending perpendicular from the bottom side of the cover member; wherein the cabinet has opposed open ends.

7. The slideout truck bed cover and shelving assembly as described in claim 6, wherein the first side wall has an upper portion which is perpendicular to the cover member and has a lower portion which is angled inwardly of the cabinet towards the second side wall to properly fit about wheel wells of the truck bed.

8. The slideout truck bed cover and shelving assembly as described in claim 6, wherein the cabinet further includes a bottom shelf interconnecting the first and second side walls and also includes an intermediate shelf spaced above the bottom shelf and interconnecting the first and second side walls and forming an upper compartment between the cover member and the intermediate shelf and forming a lower compartment between the intermediate and bottom shelves.

9. The slideout truck bed cover and shelving assembly as described in claim 8, wherein the cabinet also includes upper drawers slidably disposed through the opposed open ends in the upper compartment upon the intermediate shelf and further includes lower drawers slidably disposed through the opposed open ends in the lower compartment upon the bottom shelf.

10. The slideout truck bed cover and shelving assembly as described in claim 9, wherein each of the lower drawers has a side wall facing the first side wall of the cabinet and having an upper portion which is parallel to the upper portion of the first side wall and having a lower portion angled relative to the upper portion of the side wall of the respective lower drawer and parallel to the lower portion of the first side wall.

11. The slideout truck bed cover and shelving assembly as described in claim 9, wherein the shelving assembly further includes a work platform slidably disposed through the open ends and upon the bottom shelf under the lower drawers.

12. The slideout truck bed cover and shelving assembly as described in claim 1, wherein the storage assembly includes a container having front, back, bottom and side walls and also having partition walls disposed in the container and forming separate bins within which items can be kept and stored.

13. The slideout truck bed cover and shelving assembly as described in claim 12, wherein the side walls have bottom back corners and the bottom wall has back side corners and the back wall has bottom side corners, all of which are recessed inwardly of the container and forming recessed areas of the cabinet to receive the wheel wells in the truck bed.

14. The slideout truck bed cover and shelving assembly as described in claim 13, wherein the back side corners of the bottom wall are curved downwardly from the back wall towards the front wall and is shaped to accommodate the wheel wells of the truck bed.

\* \* \* \* \*